(12) United States Patent
Yasuda

(10) Patent No.: US 8,654,421 B2
(45) Date of Patent: Feb. 18, 2014

(54) EXPOSURE DEVICE AND IMAGE FORMING DEVICE

(75) Inventor: Shin Yasuda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 295 days.

(21) Appl. No.: 12/871,145

(22) Filed: Aug. 30, 2010

(65) Prior Publication Data

US 2011/0199659 A1 Aug. 18, 2011

(30) Foreign Application Priority Data

Feb. 12, 2010 (JP) .................................. 2010-029081

(51) Int. Cl.
*G02B 5/32* (2006.01)

(52) U.S. Cl.
USPC ................................ 359/17; 359/20; 347/224

(58) Field of Classification Search
USPC ........ 359/15, 17, 16, 19, 20, 27, 28; 347/118, 347/224, 225, 232–234, 238, 239, 241, 244, 347/251–254; 250/492.1
See application file for complete search history.

(56) References Cited

U.S. PATENT DOCUMENTS

| 4,447,126 | A | * | 5/1984 | Heidrich et al. | ............... | 385/119 |
| 4,700,206 | A | | 10/1987 | Yamakawa | | |
| 5,543,830 | A | * | 8/1996 | Lea | ............... | 347/241 |
| 2007/0223073 | A1 | * | 9/2007 | Someno | ......................... | 359/15 |
| 2009/0252018 | A1 | * | 10/2009 | Tanabe et al. | ............. | 369/112.15 |
| 2010/0259739 | A1 | * | 10/2010 | Minabe et al. | ................... | 355/67 |
| 2011/0013156 | A1 | * | 1/2011 | Kawano et al. | ................... | 355/2 |
| 2011/0205606 | A1 | * | 8/2011 | Minabe et al. | ................... | 359/12 |

FOREIGN PATENT DOCUMENTS

| JP | A-60-116479 | 6/1985 |
| JP | A-2007-237576 | 9/2007 |

* cited by examiner

*Primary Examiner* — Stephone B Allen
*Assistant Examiner* — James McGee
(74) *Attorney, Agent, or Firm* — Oliff PLC

(57) ABSTRACT

There is provided an exposure device including: a light-emitting element array in which plural light-emitting elements are arrayed in a predetermined direction; and a hologram element array in which plural hologram elements are multiplex-recorded, in correspondence with the plural light-emitting elements, at a recording layer that is disposed above the light-emitting element array such that collected-light points, that are formed on a surface to be exposed by converging of diffracted lights that exit due to illumination of lights from the plural light-emitting elements, are aligned in the predetermined direction, and such that intersection points between optical axes of reference lights and optical axes of signal lights that record the plural hologram elements respectively are not aligned in the predetermined direction.

6 Claims, 9 Drawing Sheets

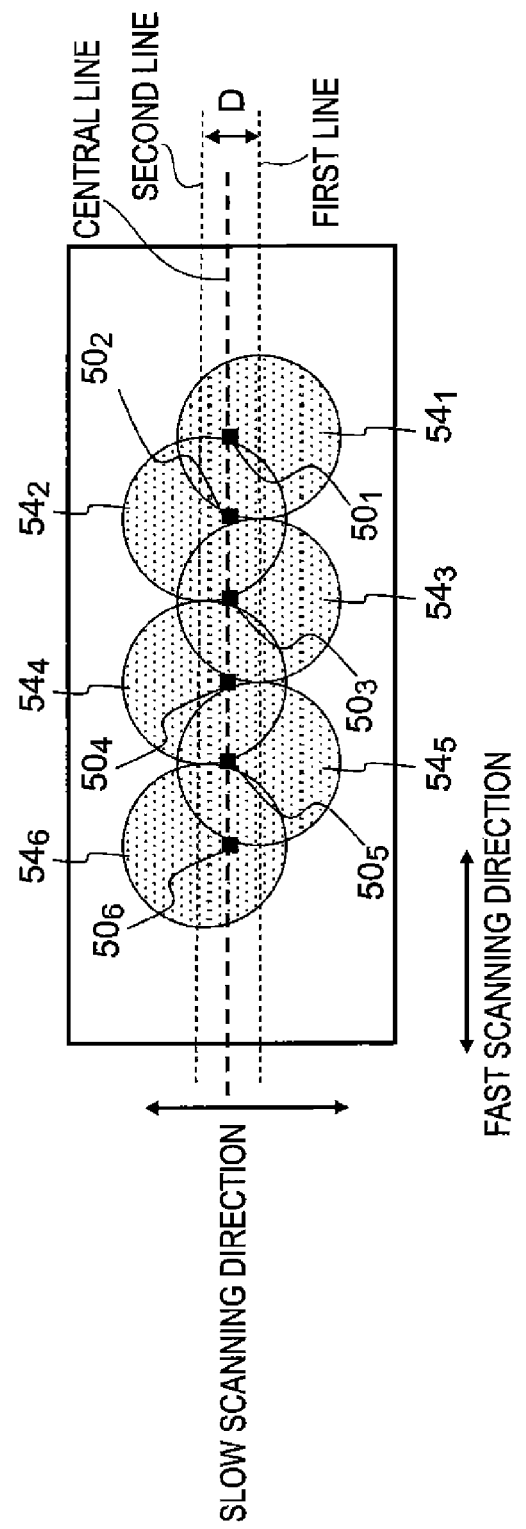

US 8,654,421 B2

EXPOSURE DEVICE AND IMAGE FORMING DEVICE

CROSS-REFERENCE TO RELATED APPLICATION

This application is based on and claims priority under 35 USC 119 from Japanese Patent Application No. 2010-029081 filed on Feb. 12, 2010.

BACKGROUND

Technical Field

The present invention relates to an exposure device and an image forming device.

SUMMARY

According to an aspect of the present invention, there is provided an exposure device including:

a light-emitting element array in which plural light-emitting elements are arrayed in a predetermined direction; and a hologram element array in which plural hologram elements are multiplex-recorded, in correspondence with the plural light-emitting elements, at a recording layer that is disposed above the light-emitting element array such that collected-light points, that are formed on a surface to be exposed by converging of diffracted lights that exit due to illumination of lights from the plural light-emitting elements, are aligned in the predetermined direction, and such that intersection points between optical axes of reference lights and optical axes of signal lights that record the plural hologram elements respectively are not aligned in the predetermined direction.

BRIEF DESCRIPTION OF THE DRAWINGS

Exemplary embodiments of the present invention will be described in detail based on the following figures, wherein:

FIG. 3 is a schematic plan view showing an example of the arrangement of hologram elements of the LED print head shown in FIG. 2;

DETAILED DESCRIPTION

Examples of exemplary embodiments of the present invention are described in detail below with reference to the drawings.

<Image Forming Device Provided with LED Print Heads>

First, an image forming device, that is provided with LED print heads relating to an exemplary embodiment of the present invention, is described. In copiers, printers and the like that form images by an electrophotographic method, there is the trend toward using, as the exposure device that writes an electrostatic image on a photoreceptor drum, an LED-type exposure device that uses light-emitting diodes (LEDs) as the light source rather than a conventional laser ROS (Raster Output Scanner) type exposure device. In an LED-type exposure device, there is no need for a scanning optical system, and the device can be made to be much more compact than a laser ROS type device. Further, a driving motor for driving a polygon mirror is not needed, and there is also the advantage that mechanical noise is not generated.

An LED-type exposure device is called an LED print head, which is abbreviated as LPH. A conventional LED print head has an LED array in which numerous LEDs are arrayed on an elongated substrate, and a lens array at which numerous refractive index distribution type rod lenses are arrayed. At the LED array, the many LEDs are arrayed in correspondence with the number of pixels in the fast scanning direction, e.g., 1200 pixels per inch (i.e., 1200 dpi). Conventionally, rod lenses such as SELFOC® lenses or the like are used in the lens array. The lights emitted from the respective LEDs are collected at the rod lenses, and an erect equal magnification image is imaged on the photoreceptor drum.

LED print heads using "hologram elements" instead of rod lenses are being studied. The image forming device relating to the present exemplary embodiment has LED print heads that are equipped with a "hologram element array" that is described below. In an LPH using rod lenses, the optical path length (operation distance) from the lens array end surface to the points of imaging is short at around several mm, and the exposure device occupies a large proportion of the space at the periphery of the photoreceptor drum. In contrast, at an LPH 14 having a hologram element array, the operation distance is long at around several cm, the periphery of the photoreceptor drum does not become crowded, and the image forming device is made compact on the whole.

Further, generally, in an LPH using LEDs that emit incoherent light, the coherence deteriorates and blurring of spots (so-called chromatic aberration) arise, and it is not easy to form minute spots. In contrast, in the LPH 14 that has the hologram element array, the incident angle selectivity and wavelength selectivity of the hologram elements are good, and minute spots with distinct outlines are formed on a photoreceptor drum 12.

Figure 1:
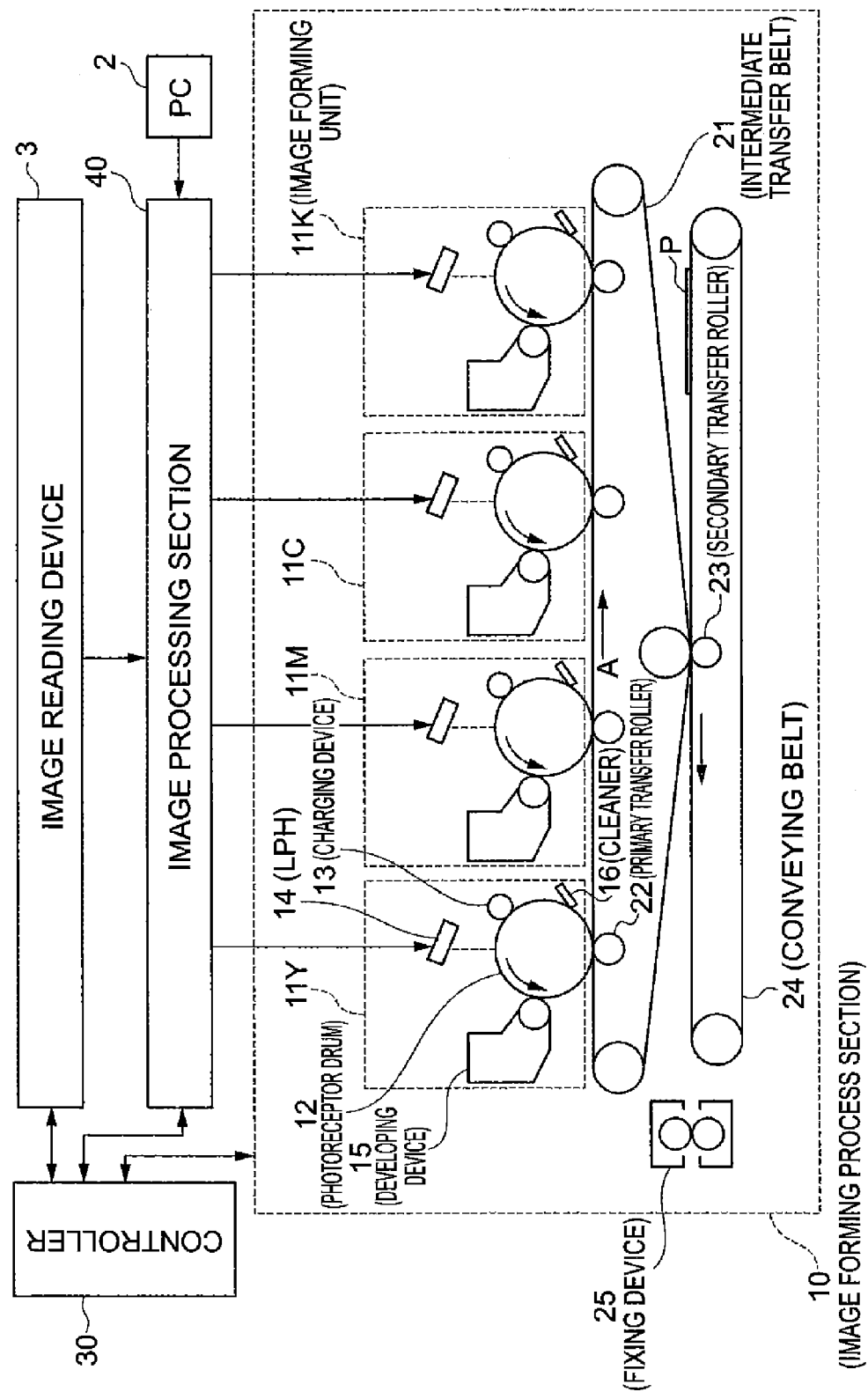
FIG. 1 is a schematic drawing showing an example of the structure of an image forming device relating to an exemplary embodiment of the present invention.

FIG. 1 is a schematic drawing showing an example of the structure of an image forming device relating to an exemplary embodiment of the present invention. The image forming device is a so-called tandem-type digital color printer, and includes: an image forming process section 10 serving as an image forming section that carries out image formation in accordance with image data of respective colors; a controller 30 that controls the operations of the image forming device;

and an image processing section 40 that is connected to external devices such as an image reading device 3 and, for example, a personal computer (PC) 2 and the like, and that carries out predetermined image processings on image data received from these devices.

The image forming process section 10 has four image forming units 11Y, 11M, 11C, 11K that are disposed in parallel at uniform intervals. The image forming units 11Y, 11M, 11C, 11K form toner images of yellow (Y), magenta (M), cyan (C), and black (K), respectively. Note that the image forming units 11Y, 11M, 11C, 11K are called the "image forming units 11" in general and appropriately.

Each of the image forming units 11 has: the photoreceptor drum 12 serving as an image carrier on which an electrostatic latent image is formed and that carries a toner image; a charging device 13 that uniformly charges the surface of the photoreceptor drum 12 at a predetermined potential; the LED print head (LPH) 14 serving as an exposure device that exposes the photoreceptor drum 12 that has been charged by the charging device 13; a developing device 15 that develops the electrostatic latent image obtained by the LPH 14; and a cleaner 16 that cleans the surface of the photoreceptor drum 12 after transfer.

The LPH 14 is an elongated print head of a length that is substantially the same as the axial direction length of the photoreceptor drum 12. The LPH 14 is disposed at the periphery of the photoreceptor drum 12, such that the lengthwise direction of the LPH 14 is directed in the axial direction of the photoreceptor drum 12. In the present exemplary embodiment, plural LEDs are arranged in the form of an array (in a row) at the LPH 14 along the lengthwise direction thereof. Further, plural hologram elements, that correspond to the plural LEDs, are arranged in the form of an array above the LED array.

As described below, the operation distance of the LPH 14 that is equipped with the hologram element array is long, and the LPH 14 is disposed so as to be separated from the surface of the photoreceptor drum 12 by several cm. Therefore, the width that the LPH 14 occupies in the peripheral direction of the photoreceptor drum 12 is small, and crowding at the periphery of the photoreceptor drum 12 is mitigated.

The image forming process section 10 has: an intermediate transfer belt 21 onto which the toner images of the respective colors, that were formed on the photoreceptor drums 12 of the respective image forming units 11, are transferred in a superposed manner; primary transfer rollers 22 that successively transfer (primarily transfer) the respective toner images of the image forming units 11 onto the intermediate transfer belt 21; a secondary transfer roller 23 that collectively transfers (secondarily transfers) the superposed toner images, that have been transferred on the intermediate transfer belt 21, onto a sheet P that is a recording medium; and a fixing device 25 that fixes the secondarily-transferred images onto the sheet P.

Operation of the image forming device is described next.

First, the image forming process section 10 carries out image formation operation on the basis of control signals such as synchronous signals and the like that are supplied from the controller 30. At this time, the image data, that is inputted from the image reading device 3 or the PC 2, is subjected to image processings by the image processing section 40, and is supplied to the respective image forming units 11 via an interface.

At the yellow image forming unit 11Y for example, the surface of the photoreceptor drum 12, that has been charged uniformly at a predetermined potential by the charging device 13, is exposed by the LPH 14 that emits light on the basis of the image data obtained from the image processing section 40, such that an electrostatic latent image is formed on the photoreceptor drum 12. Namely, due to the respective LEDs of the LPH 14 emitting light on the basis of the image data, the surface of the photoreceptor drum 12 is fast-scanned, and, due to the photoreceptor drum 12 rotating, the surface of the photoreceptor drum 12 is slow-scanned, and an electrostatic latent image is formed on the photoreceptor drum 12. The formed electrostatic latent image is developed by the developing device 15, and a yellow toner image is formed on the photoreceptor drum 12. Similarly, toner images of the respective colors of magenta, cyan, black are formed at the image forming units 11M, 11C, 11K.

The toner images of the respective colors, that are formed at the image forming units 11, are successively attracted electrostatically by the primary transfer rollers 22 and transferred (primarily transferred) onto the intermediate transfer belt 21 that rotates in the direction of arrow A in FIG. 1. A superposed toner image is formed on the intermediate transfer belt 21. As the intermediate transfer belt 21 moves, the superposed toner image is conveyed to a region (secondary transfer portion) where the secondary transfer roller 23 is disposed. When the superposed toner image is conveyed to the secondary transfer portion, the sheet P is supplied to the secondary transfer portion in accordance with the timing at which the toner image is conveyed to the secondary transfer portion.

Then, due to a transfer electric field that is formed by the secondary transfer roller 23 at the secondary transfer portion, the superposed toner image is electrostatically transferred (secondarily transferred) collectively onto the sheet P that is conveyed-in. The sheet P, on which the superposed toner image has been electrostatically transferred, is peeled-off from the intermediate transfer belt 21, and is conveyed by a conveying belt 24 to the fixing device 25. The unfixed toner image on the sheet P that is conveyed to the fixing device 25 is subjected to fixing processing by heat and pressure by the fixing device 25, and is thereby fixed on the sheet P. Then, the sheet P on which the fixed image is formed is discharged-out to a sheet discharge tray (not illustrated) that is provided at a discharging section of the image forming device.

<LED Print Head (LPH)>

Figure 2:
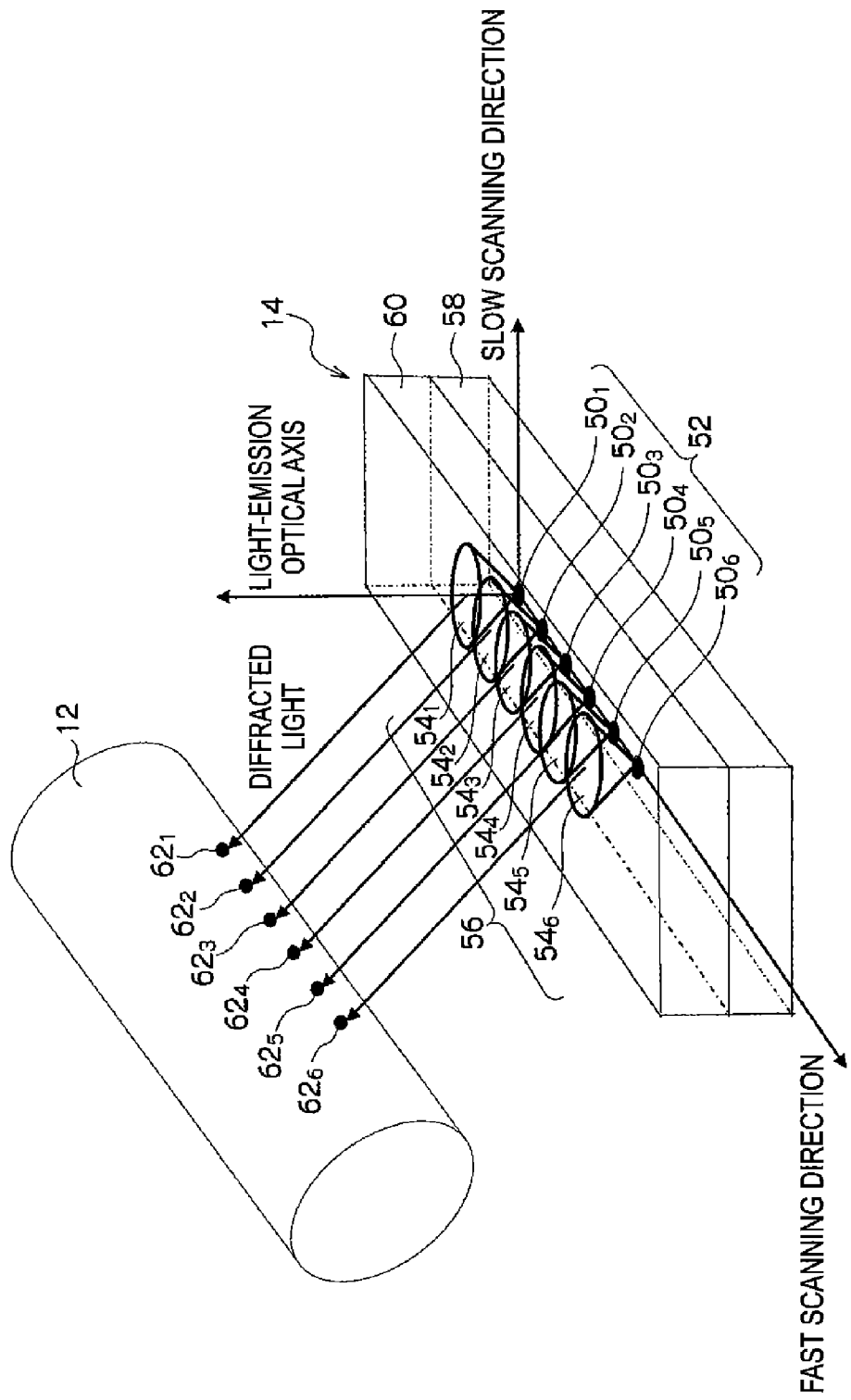
FIG. 2 is a schematic perspective view showing an example of the structure of an LED print head relating to the exemplary embodiment of the present invention.

FIG. 2 is a schematic perspective view showing an example of the structure of an LED print head relating to the exemplary embodiment of the present invention. As shown in FIG. 2, the LED print head (LPH 14) has an LED array 52 having plural LEDs 50, and a hologram element array 56 having plural hologram elements 54 that are provided so as to correspond respectively to the plural LEDs 50. In the example shown in FIG. 2, the LED array 52 has six LEDs $50_1$ through $50_6$, and the hologram element array 56 has six hologram elements $54_1$ through $54_6$. Note that, when there is no need to differentiate among the respective elements, the LEDs $50_1$ through $50_6$ are called the "LEDs 50" in general, and the hologram elements $54_1$ through $54_6$ are called the "hologram elements 54" in general.

The respective LEDs 50 are arrayed on an LED chip 53. The LED chip 53 on which the plural LEDs 50 are arrayed is, together with driving circuits (not shown) that drive the respective LEDs 50, packaged on an elongated LED substrate 58. The LED chip 53 is disposed on the LED substrate 58 with the plural LEDs 50 being aligned so as to be aligned in the fast scanning direction. Due thereto, the respective LEDs 50 are arrayed along a direction parallel to the axial direction of the photoreceptor drum 12.

The direction in which the LEDs 50 are arrayed is the "fast scanning direction". Further, the respective LEDs 50 are arrayed such that the intervals (the light-emitting point pitch)

in the fast scanning direction between two adjacent LEDs 50 (light-emitting points) are uniform intervals. Note that slow scanning is carried out by the rotation of the photoreceptor drum 12, and the direction orthogonal to the "fast scanning direction" is illustrated as the "slow scanning direction". Further, in the following description, the positions at which the LEDs 50 are disposed are called "light-emitting points" appropriately.

An LED array of any of various forms, such as an LED array in which plural LEDs are packaged on a substrate in units of chips, or the like, may be used as the LED array 52. If plural LED chips, at which plural LEDs are arrayed, are arrayed, the plural LED chips may be disposed in a straight line, or may be disposed in a staggered form. Further, two or more of the LED chips may be disposed in the slow scanning direction. In FIG. 2, the LED array 52, in which the plural LEDs 50 are arrayed in a one-dimensional form on the one LED chip 53, is merely illustrated schematically.

As described below, in the present exemplary embodiment, the plural LED chips 53 are arranged in a staggered form at the LED array 52 (see FIG. 8). Namely, the plural LED chips 53 are disposed in two rows that are offset by a uniform interval in the slow scanning direction, with the plural LED chips 53 aligned in the fast scanning direction in each row. Even when divided among plural LED chips 53, the respective LEDs 50 are arrayed such that the interval, in the fast scanning direction, between two adjacent LEDs 50 is a uniform interval.

An SLED array may be used as the LED array 52. An SLED array is structured by plural SLED chips (not illustrated), at which plural self-scanning LEDs (SLEDs) are arrayed, being arrayed such that the respective LEDs are aligned in the fast scanning direction. An SLED array turns switches on and off by two signal wires, and can make the respective SLEDs emit light selectively, and data lines are used in common. By using an SLED array, a smaller number of wires on the LED substrate 58 suffices.

A hologram recording layer 60 is formed on the LED substrate 58 so as to cover the LED chip 53. The hologram element array 56 is formed within the hologram recording layer 60 that is formed on the LED substrate 58. As is described later, there is no need for the LED substrate 58 and the hologram recording layer 60 to fit tightly together, and they may be separated by a predetermined distance via an air layer or a transparent resin layer or the like. For example, the hologram recording layer 60 may be held by an unillustrated holding member at a position that is separated, by a predetermined height, from the LED substrate 58.

The plural hologram elements $54_1$ through $54_6$ are formed at the hologram recording layer 60 along the fast scanning direction in correspondence with the respective LEDs $50_1$ through $50_6$. Note that, although it appears in FIG. 2 that the plural hologram elements $54_1$ through $54_6$ are disposed in a single row, the plural hologram elements $54_1$ through $54_6$ are disposed in a staggered form in two rows in the present exemplary embodiment. The arrangement of the hologram elements 54 is described in detail next. The respective hologram elements 54 are arrayed such that the interval in the fast scanning direction between the two hologram elements 54 that are adjacent to one another is substantially the same interval as the aforementioned interval in the fast scanning direction of the LEDs 50. Namely, the hologram elements 54 whose diameters are large are formed such that the two hologram elements 54 that are adjacent to one another overlap one another. Further, the two hologram elements 54 that are adjacent to one another may have different shapes.

The hologram recording layer 60 is structured from a polymer material that can record and hold a hologram permanently. A so-called photopolymer may be used as this polymer material. A photopolymer records a hologram by utilizing the change in the refractive index due to polymerization of photopolymerizable monomers.

When the LEDs 50 are made to emit light, the lights (incoherent lights) that are emitted from the LEDs 50 pass through the optical paths of diffused lights that spread from the light-emitting points to the hologram diameters. Due to the emission of light by the LEDs 50, the situation is substantially the same as reference light being illuminated onto the hologram elements 54. As shown in FIG. 2, in the LPH 14 that is equipped with the LED array 52 and the hologram element array 56, the respective lights emitted from the six LEDs $50_1$ through $50_6$ are incident on the corresponding one of the hologram elements $54_1$ through $54_6$. The hologram elements $54_1$ through $54_6$ diffract the incident lights and generate diffracted lights. The respective diffracted lights, that are generated by the hologram elements $54_1$ through $54_6$ respectively, avoid the optical paths of the diffused lights, and exit in directions such that the optical axes thereof form an angle θ with the light-emitting optical axes, and are collected in the direction of the photoreceptor drum 12.

The respective diffracted lights that exit are converged in the direction of the photoreceptor drum 12, and are imaged at the surface of the photoreceptor drum 12 that is disposed at the focal plane that is several cm ahead. Namely, the respective hologram elements 54 function as optical members that diffract and collect the lights emitted from the corresponding LEDs 50, and image the lights on the surface of the photoreceptor drum 12. Minute spots $62_1$ through $62_6$ due to these diffracted lights are formed on the surface of the photoreceptor drum 12 so as to be arrayed in a single row in the fast scanning direction. In other words, the photoreceptor drum 12 is fast-scanned by the LPH 14. Note that, when there is no need to differentiate therebetween, the spots $62_1$ through $62_6$ are called the "spots 62" in general.

<Arrangement of Hologram Elements>

The arrangement of the hologram elements is described next. FIG. 3 is a schematic plan view showing an example of the arrangement of the hologram elements of the LED print head. FIG. 3 is a plan view when viewing the LPH 14 shown in FIG. 2 from the hologram recording layer 60 side, and is a transparent view in order to clarify the positional relationships between the LEDs 50 and the corresponding hologram elements 54.

Here, the "positions" of the hologram elements 54 are described. As discussed below, the hologram elements 54 are recorded by interference of signal lights and reference lights. Accordingly, the intersection point of the optical axis of the signal light and the optical axis of the reference light when recording the hologram element 54 shows the position of the hologram element 54. In the example shown in FIG. 3, the hologram elements 54 that are substantially circular in plan view are illustrated, and the central points of the circles correspond to the intersection points of the optical axes of the signal lights and the optical axes of the reference lights.

As shown in FIG. 3, in the present exemplary embodiment, the plural LEDs $50_1$ through $50_6$ are arranged in one row in the fast scanning direction, whereas the plural hologram elements $54_1$ through $54_6$ are arranged in a staggered form in two rows in the fast scanning direction. Concretely, the respective intersection points of the hologram element $54_1$, the hologram element $54_3$, and the hologram element $54_5$ are disposed on a first line, and the respective intersection points of the hologram element $54_2$, the hologram element $54_4$, and the hologram element $54_6$ are disposed on a second line that is apart from the first line by distance D in the slow scanning direction.

The plural LEDs $50_1$ through $50_6$ are disposed on the same line that is shown by the dashed line. Given that this line is the central line, the central line is disposed midway between the first line and the second line. It is desirable that the plural hologram elements $54_1$ through $54_6$ are disposed in a range intersecting this central line so that, at the surface of the photoreceptor drum 12, the intensities of the spots $62_1$ through $62_6$ formed by the diffracted lights are as large and as uniform as possible.

As described below, the plural hologram elements 54 are shift-multiplex-recorded such that adjacent holograms greatly overlap. Considering the hologram element $54_1$, for the hologram that is multiplex-recorded on the hologram element $54_1$, and the adjacent hologram element $54_2$ in particular, the fast scanning direction is a direction in which it is easy for Bragg degeneracy to occur, i.e., is a direction in which the readout reference light of the hologram element $54_1$ satisfies the Bragg condition of the hologram element $54_2$ and easily generates diffracted light. In contrast, the slow scanning direction is a direction in which shift selectivity is rigid, i.e., is a direction in which it is difficult for the readout reference light of the hologram element $54_1$ to satisfy the Bragg condition of the hologram element $54_2$ and difficult to generate diffracted light.

For example, the diffracted light, that is generated by light that exits from the LED $50_1$ corresponding to the hologram element $54_1$ being incident on the adjacent hologram element $54_2$, is imaged on the surface of the photoreceptor drum 12 and forms a spot by crosstalk. However, the spot formed by crosstalk is a noise spot that is formed at a position that is away from both the spot $62_1$ corresponding to the hologram element $54_1$ and the spot $62_2$ corresponding to the hologram element $54_2$.

Accordingly, as shown in FIG. 3, by dispersing the positions, in the slow scanning direction, of the plural hologram elements 54 that are multiplex-recorded (i.e., by arranging the hologram elements 54 such that they are not aligned in a single row), the occurrence of crosstalk due to Bragg degeneracy is reduced. In particular, the occurrence of crosstalk can be reduced even more when positions, in the slow scanning direction, of the two hologram elements 54 that are adjacent to one another (e.g., the hologram element $54_1$ and the hologram element $54_2$, the hologram element $54_2$ and the hologram element $54_3$) are offset.

Figure 8A:
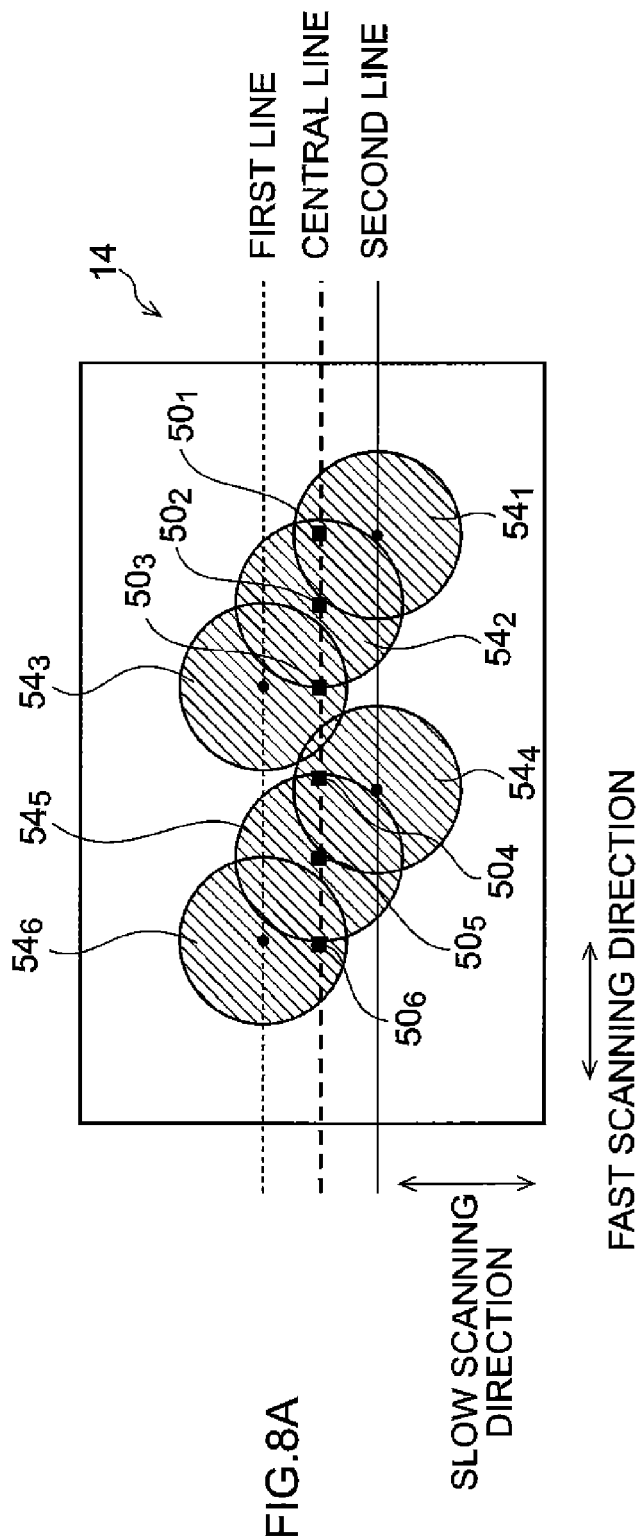
FIG. 8A is a schematic plan view showing another example of the arrangement of the hologram elements of the LED print head.
Figure 8B:
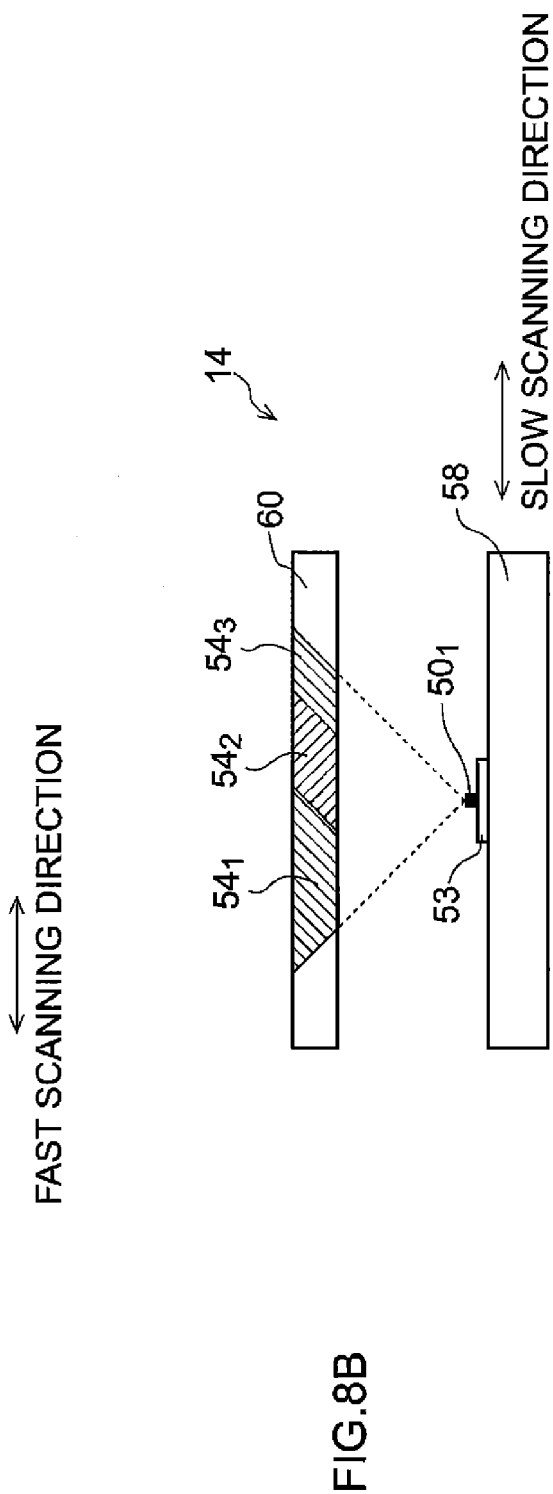
FIG. 8B is a sectional view, in the slow scanning direction, of the LED print head.

Note that, although FIG. 3 illustrates an example in which the plural hologram elements $54_1$ through $54_6$ are arranged in a staggered form in two rows, it suffices for the positions, in the slow scanning direction, of the plural hologram elements 54 that are multiplex-recorded to be dispersed, and the arrangement of the hologram elements 54 is not limited to a staggered form of two rows. FIG. 8A and FIG. 8B are drawings showing another example of an arrangement of the hologram elements of the LED print head. In this example, the plural hologram elements $54_1$ through $54_6$ are arranged in three rows that are a first line, a second line and a central line. Note that the point that it is preferable for the plural hologram elements 54 to be disposed in a range that intersects the central line is the same as in the example shown in FIG. 3.

The increase in the number of rows enlarges the two-dimensional range (the surface area when seen in plan view) of the hologram elements 54. This means that the degree of multiplexing per unit surface area is decreased. Therefore, noise that arises due to multiplex recording is reduced, and the quality (SN ratio) of the diffracted light improves. Note that, although increasing the number of rows is a main cause of non-uniformity of the diffracted light intensities, it suffices to suppress the diffracted light intensities becoming non-uniform by adjusting the diffraction efficiency of the holograms, or the like.

<Shape of Hologram Element>

Figure 4A:
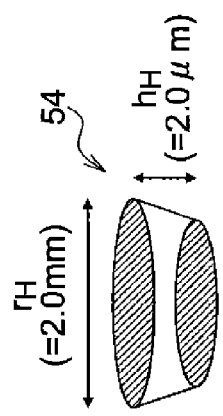
FIG. 4A is a perspective view showing the schematic shape of the hologram element.
Figure 4B:
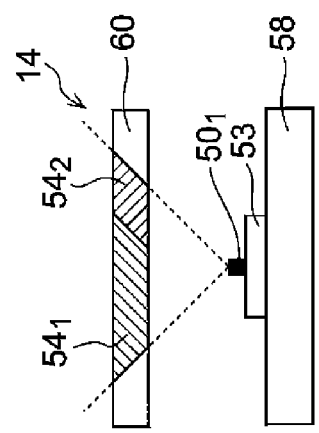
FIG. 4B is a sectional view, in a slow scanning direction, of the LED print head.
Figure 4C:
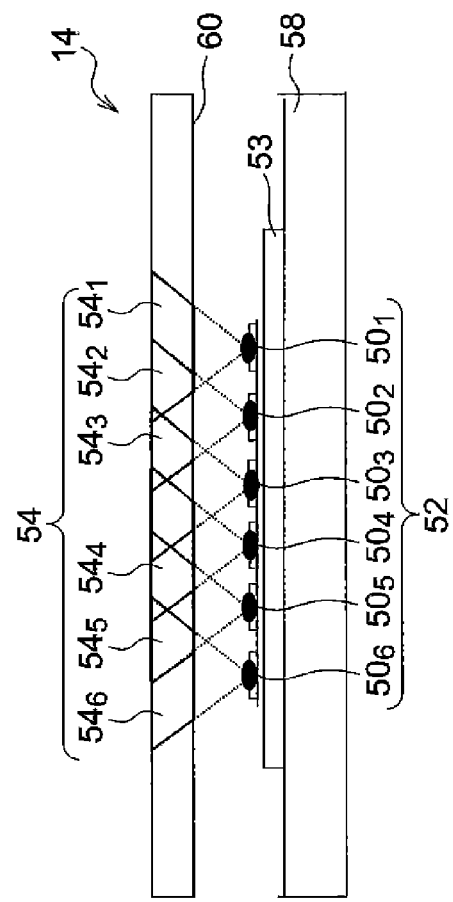
FIG. 4C is a sectional view, in a fast scanning direction, of the LED print head.

FIG. 4A is a perspective view showing the schematic shape of the hologram element. FIG. 4B is a sectional view, in the slow scanning direction, of the LED print head. FIG. 4C is a sectional view, along the fast scanning direction, of the LED print head.

As shown in FIG. 4A, each of the hologram elements 54 is a thick hologram that is generally called a volume hologram. Further, as shown in FIG. 4A and FIG. 4B, each of the hologram elements 54 is formed in the shape of a truncated cone whose side at the obverse of the hologram recording layer 60 is the floor surface and that converges toward the LED 50 side. A truncated cone shaped hologram element is described in this example, but the shape of the hologram element is not limited to the same. For example, the hologram element may be made into the shape of a cone, an oval cone, a truncated oval cone, or the like. The diameter of the truncated cone shaped hologram element 54 is greatest at the floor surface. The diameter of the floor surface of this circle is "hologram diameter $r_H$".

Each of the hologram elements 54 has the "hologram diameter $r_H$" that is greater than the interval between the LEDs 50 in the fast scanning direction. For example, the interval between the LEDs 50 in the fast scanning direction is 30 μm, the hologram diameter $r_H$ is 2 mm, and a hologram thickness $N_H$ is 250 μm. Accordingly, as shown in FIG. 2, FIG. 3, FIG. 4B and FIG. 4C, two of the hologram elements 54 that are adjacent to one another are formed so as to greatly overlap each other. The plural hologram elements 54 are multiplex-recorded by, for example, shift multiplexing method with spherical waves. Note that the respective hologram elements 54 may be recorded by the same wavelength, or may be recorded by combining plural wavelengths (wavelength multiplexing).

The respective LEDs 50 are disposed on the LED substrate 58 with the light-emitting surfaces thereof directed toward the obverse side of the hologram recording layer 60, so as to emit light toward the corresponding hologram elements 54. The "light-emission optical axis" of the LED 50 intersects the corresponding hologram element 54, and is directed in a direction orthogonal to the LED substrate 58. The LED 50 is a diffused light source, and, as shown in FIG. 4B, the light exiting from the LED 50 is also illuminated onto the hologram elements 54 that are adjacent to the corresponding hologram element 54. However, in the present exemplary embodiment, as described above, the occurrence of crosstalk is reduced by dispersing the slow scanning direction positions of the plural hologram elements 54. Note that the light-emission optical axis is orthogonal to both the fast scanning direction and the slow scanning direction as illustrated.

Although not illustrated, the LPH 14 is held by a holding member such as a housing or a holder or the like so that the diffracted lights generated at the hologram elements 54 exit in the direction of the photoreceptor drum 12, and is mounted to a predetermined position within the image forming unit 11 shown in FIG. 1. Note that the LPH 14 may be structured so as to move in the optical axis direction of the diffracted lights by an adjusting means such as an adjusting screw (not illustrated) or the like. The imaged positions (focal plane) at which the lights are imaged by the hologram elements 54 are adjusted by this adjusting means so as to be positioned on the surface of the photoreceptor drum 12. Further, a protective layer may be formed of a covering glass, a transparent resin, or the like on the hologram recording layer 60. The adhering of dust is prevented by the protective layer.

<Method of Recording Hologram>

Figure 5A:
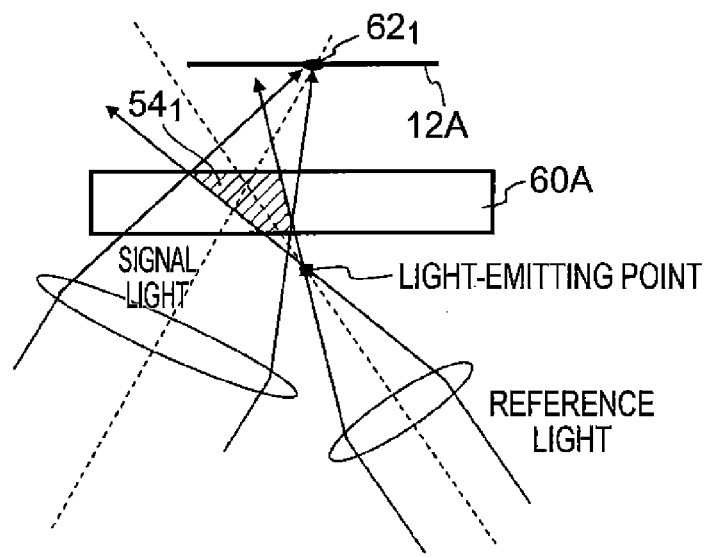
FIG. 5A and FIG. 5B are drawings showing a state in which a hologram is recorded.
Figure 5B:
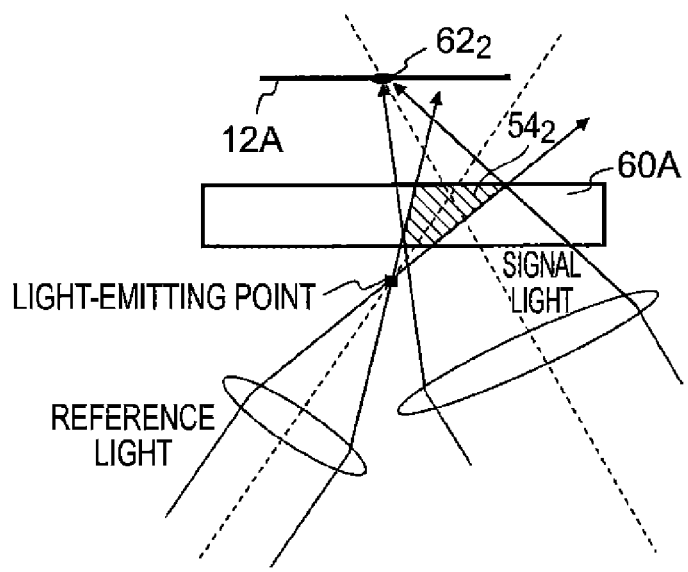

The method of recording the hologram is described next. FIG. 5A and FIG. 5B are drawings showing a state in which the hologram element 54 is formed at the hologram recording layer, i.e., a state in which a hologram is recorded at the hologram recording layer. Illustration of the photoreceptor drum 12 is omitted, and only a surface 12A that is the imaging surface is shown. Further, a hologram recording layer 60A is the recording layer before the hologram elements 54 have been formed. The reference letter "A" is added in order to distinguish it from the hologram recording layer 60 at which the hologram elements 54 have been formed.

As shown in FIG. 5A and FIG. 5B, coherent light, that passes through the optical path of the diffracted light that is to be imaged on the surface 12A, is illuminated as signal light onto the hologram recording layer 60A. Simultaneously, coherent light, that passes through the optical path of the diffused light that spreads from the light-emitting point to the desired hologram diameter $r_H$ at the time of passing through the hologram recording layer 60A, is illuminated onto the hologram recording layer 60A as reference light. A laser light source such as a semiconductor laser or the like is used in the illuminating of the coherent light.

The signal light and the reference light are illuminated onto the hologram recording layer 60A from the same side (the side at which the LED substrate 58 is disposed). The interference fringes (intensity distribution) obtained by interference between the signal light and the reference light are recorded over the depth direction of the hologram recording layer 60A. Due thereto, the hologram recording layer 60 at which the transmission-type hologram elements 54 are formed is obtained. The hologram element 54 is a volume hologram in which the intensity distribution of the interference fringes is recorded in the surface direction and in the depth direction. The LPH 14 is fabricated by mounting the hologram recording layer 60 on the LED substrate 58 to which the LED array 52 is packaged.

FIG. 5A and FIG. 5B are sectional views in the slow scanning direction. The light-emitting point is positioned on the central line, and the left side of the drawing corresponds to the first line side, and the right side of the drawing corresponds to the second line side. In the present exemplary embodiment, the plural hologram elements 54 are arrayed so as to not be aligned in a single row. Hereinafter, explanation is given of an example of a method of recording the plural hologram elements 54 with the positions thereof in the slow scanning direction being offset, that is an example in which the plural hologram elements $54_1$ through $54_6$ are arranged in a staggered form in two rows such as shown in FIG. 3 for example.

When recording the hologram element $54_1$ that is on the first line, as shown in FIG. 5A, it suffices to illuminate the reference light from the second line side such that the optical axis passes through the light-emitting point, and to illuminate the signal light from the first line side such that the spot $62_1$ is aligned in the fast scanning direction. Further, when recording the hologram element $54_2$ that is on the second line, as shown in FIG. 5B, it suffices to illuminate the reference light from the first line side such that the optical axis passes through the light-emitting point, and to illuminate the signal light from the second line side such that the spot $62_2$ is aligned in the fast scanning direction.

<Method of Reconstructing Hologram>

Figure 6A:
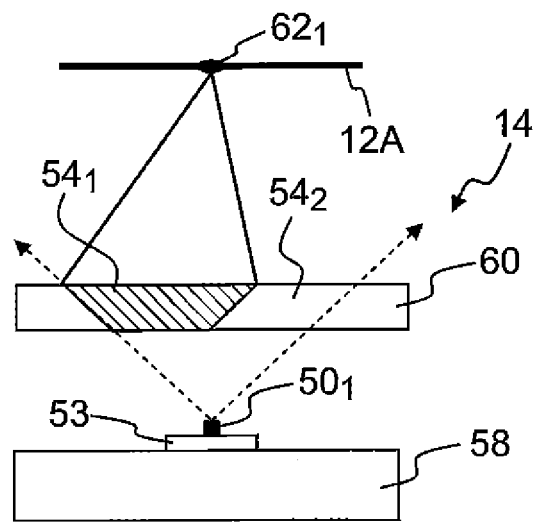
FIG. 6A and FIG. 6B are drawings showing a state in which a hologram is reconstructed and diffracted light is generated.
Figure 6B:
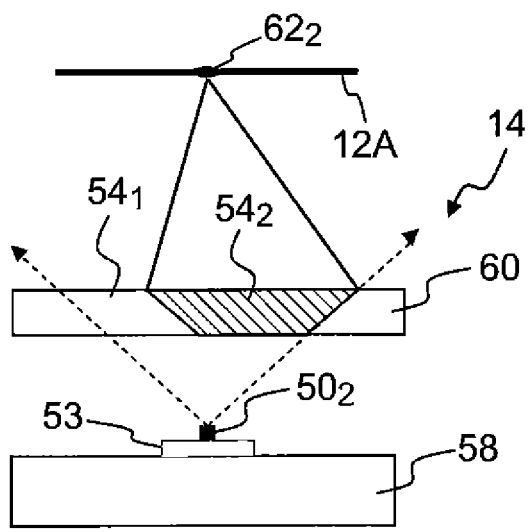

The method of reconstructing the hologram is described next. FIG. 6A and FIG. 6B are drawings showing a state in which diffracted light is generated from the hologram element, i.e., a state in which the hologram recorded on the hologram recording layer is reconstructed and diffracted light is generated. As shown in FIG. 6A and FIG. 6B, when the LED 50 is made to emit light, the light emitted from the LED 50 passes through the optical path of the diffused light that spreads from the light-emitting point to the hologram diameter $r_H$. Due to the emission of light by the LED 50, there becomes a situation that is substantially the same as the reference light being illuminated onto the hologram element 54.

As shown in FIG. 6A and FIG. 6B, due to the illumination of the reference light that is illustrated by the dashed lines, light that is the same as the signal light is reconstructed from the hologram element 54 and exits as diffracted light as shown by the solid lines. The diffracted light that has exited is converged, and is imaged onto the surface 12A of the photoreceptor drum 12 at an operation distance of several cm. The spot 62 is formed on the surface 12A. Note that, although the surface 12A is illustrated schematically, because the hologram diameter $r_H$ is several mm and the operation distance L is several cm, the surface 12A is at a position that is quite far apart. Therefore, the hologram element 54 is formed in a truncated cone shape.

As shown in FIG. 2, the six spots $62_1$ through $62_6$ are formed so as to be aligned in a single row in the fast scanning direction on the photoreceptor drum 12, in correspondence with the LEDs $50_1$ through $50_6$ of the LED array 52. The six spots $62_1$ through $62_6$ are imaged spots at which the diffracted lights of the hologram elements $54_1$ through $54_6$ are imaged. A volume hologram in particular has high incident angle selectivity and wavelength selectivity, and high diffraction efficiency is obtained. Therefore, background noise is reduced, the signal light is accurately reconstructed, and a minute spot (light collected point) of a distinct outline is formed on the surface 12A.

As shown in FIG. 6A and FIG. 6B, the diffused light that is emitted from the LED 50 is illuminated also onto the hologram elements 54 that are adjacent to the corresponding hologram element 54. However, in the present exemplary embodiment, by making the positions, in the slow scanning direction, of the adjacent hologram elements 54 differ, hardly any diffracted light from the adjacent hologram elements is generated. As shown in FIG. 6A, when the LED $50_1$ is made to emit light, the light exiting from the LED $50_1$ is diffracted at the hologram element $54_1$, and the spot $62_1$ is formed on the surface 12A of the photoreceptor drum. Further, as shown in FIG. 6B, when the LED $50_2$ is made to emit light, the light exiting from the LED $50_2$ is diffracted at the hologram element $54_2$, and the spot $62_2$ is formed on the surface 12A of the photoreceptor drum.

<Concrete Structure of LPH>

The more detailed structure of the LPH is described is described next. FIG. 2 schematically illustrates an example in which the six LEDs $50_1$ through $50_6$ are arrayed in one line, but, in an actual image forming device, several thousand of the LEDs 50 are arrayed in accordance with the resolution in the fast scanning direction. To explain by using an SLED array as an example, for example, an SLED array is structured by 58 SLED chips, at each of which 128 SLEDs are arrayed at an interval of 1200 spi (spots per inch), being arrayed rectilinearly such that the SLEDs are aligned along the fast scanning direction. When calculated, 7424 of the SLEDs are arrayed at an interval of 21 μm in an image forming device of a resolution of 1200 dpi. In correspondence with these 7424 SLEDs, 7424 of the spots 62 are formed on the photoreceptor drum 12 so as to be aligned in one row in the fast scanning direction.

Figure 7:
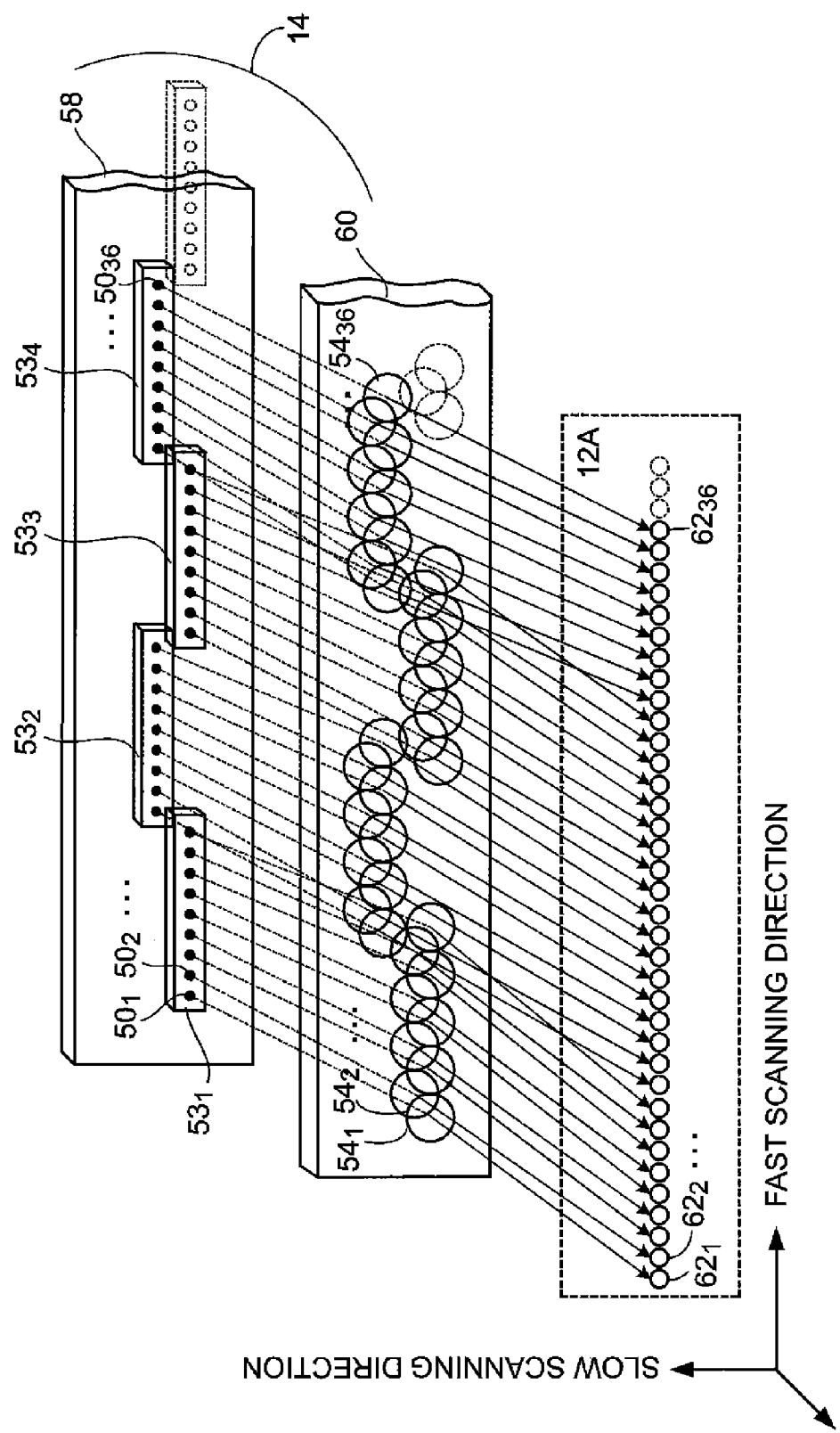
FIG. 7 is an exploded perspective view showing an example of a partial structure of the LED print head at which a hologram element array is formed in correspondence with an SLED array.

FIG. 7 is an exploded perspective view showing an example of the partial structure of an LED print head at which a hologram element array is formed in correspondence with an SLED array. The exploded perspective view of FIG. 7 more concretely illustrates the structure of the LPH that is illustrated schematically in FIG. 2, and is close to a structure that is used in an actual image forming device. Note that, when "SLEDs" are used instead of "LEDs", the same reference numeral as the LEDs 50 is applied thereto, and they are called "SLEDs 50". Further, the same reference numeral is also given to the SLED chips, and they are called "SLED chips 53".

As mentioned above, at the LPH 14 of an actual image forming device, several thousand SLEDs are arrayed in accordance with the resolution in the fast scanning direction. The LPH 14 shown in FIG. 7 has the LED substrate 58 at which the LED array 52 is packaged, and the hologram recording layer 60 at which the plural hologram elements 54 are formed. The LED array 52 is an SLED array in which the plural SLED chips 53 are disposed in a staggered form in two rows.

The exploded perspective view shown in FIG. 7 shows a state in which four of the SLED chips $53_1$ through $53_4$ are disposed in two rows in a staggered form, as a portion of the LPH 14 that is close to an actual structure. At each of the four SLED chips $53_1$ through $53_4$, nine of the SLEDs 50 are arrayed in a one-dimensional form at a predetermined interval. Further, each of the four SLED chips $53_1$ through $53_4$ is disposed such that the arrayed direction of the SLEDs 50 is directed in the fast scanning direction.

The SLED chips 53 of the first row and the SLED chips 53 of the second row are disposed in the fast scanning direction so as to be offset in two rows (i.e., in a staggered form). Namely, at the first row of the LED array 52, the SLED chip $53_1$ and the SLED chip $53_3$ are disposed so as to be adjacent to one another, and, at the second row of the LED array 52, the SLED chip $53_2$ and the SLED chip $53_4$ are disposed so as to be adjacent to one another. Accordingly, in the example shown in FIG. 7, a total of 36 of the SLEDs 50 (SLEDs $50_1$ through $50_{36}$) that are arranged in two rows are illustrated.

Further, 36 of the hologram elements $54_1$ through $54_{36}$, that have positions and shapes that have been designed in advance, are formed in respective correspondence with the 36 SLEDs 50. In this example, nine of the hologram elements 54 are formed so as to be arranged in a staggered form, in correspondence with the nine SLEDs 50 of the individual SLED chips 53. Due thereto, 36 of the spots $62_1$ through $62_{36}$ are formed in one row at uniform intervals along the fast scanning direction on the surface 12A of the photoreceptor drum 12, in respective correspondence with the 36 SLEDs $50_1$ through $50_{36}$. In an actual image forming device, several thousand of the spots 62 are formed in correspondence with several thousand of the SLEDs 50.

<Structure of LPH Having Light-Blocking Plates>

Figure 9:
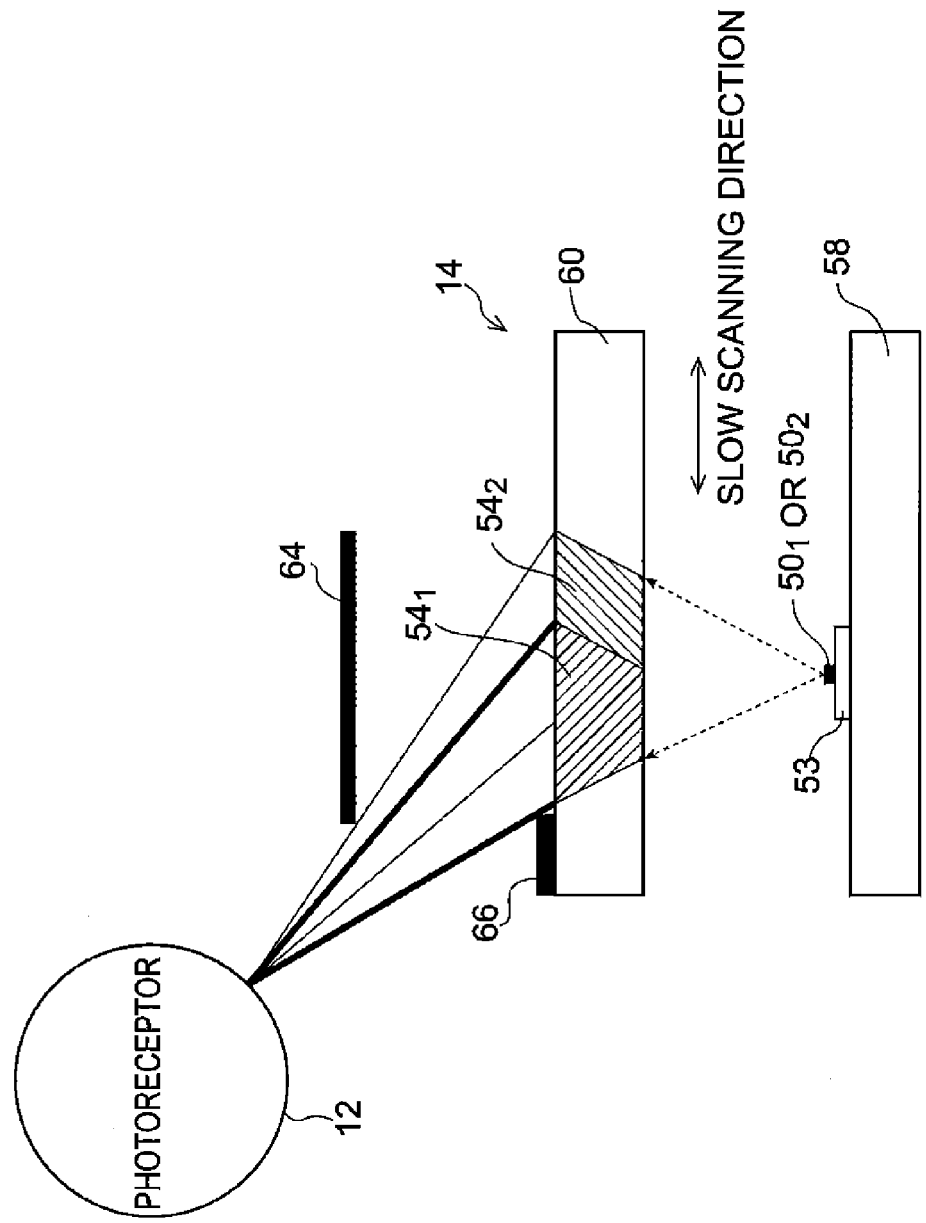
FIG. 9 is a schematic drawing showing an example of a structure in which a light-blocking plate is provided at the LED print head.

A structure in which light-blocking plates are provided at the LPH is explained next. FIG. 9 is a schematic drawing showing an example of a structure in which light blocking plates are provided at the LED print head. The LEDs 50 are diffused-light light sources, and the lights that exit from the LEDs 50 are illuminated also onto the outer sides of the corresponding hologram elements 54, and become stray lights. These stray lights are illuminated onto the surface of the photoreceptor drum 12. In the present exemplary embodiment, crosstalk from the adjacent hologram elements 54 is reduced by the arrangement of the plural hologram elements 54. However, noise due to the aforementioned stray lights is not reduced.

Thus, in order to reduce noise due to stray lights, light-blocking members are provided at the outer sides of the optical paths of the diffracted lights that exit from the plural hologram elements 54, and block the stray lights. A light-blocking plate 64, that is provided above the hologram recording layer 60 of the LPH 14, and a light-blocking plate 66, that is provided at the obverse of the hologram recording layer 60 of the LPH 14, and the like are provided as light-blocking members. An example of case, in which it is preferable to provide the light-blocking plate 64 at the upper side, is a case in which there are other parts at the reverse surface of the light-blocking plate 64, and the lights that are reflected or diffused by such other parts are illuminated onto the photoreceptor 12 or the hologram elements 54. Further, an example of a case in which it is preferable to provide the light-blocking plate 66 at the obverse is a case in which the photoreceptor 12 is at the reverse side of the light-blocking plate 66, and the diffused lights that exit from the LEDs 50 are directly illuminated onto the photoreceptor 12.

<Other Modified Examples>

Although the above describes an example having an LED print head that is equipped with plural LEDs, other light-emitting elements, such as electroluminescent elements (ELs), laser diodes (LDs) or the like, may be used instead of the LEDs. By designing the hologram elements in accordance with the characteristics of the light-emitting elements and by preventing unnecessary exposure by incoherent light, minute spots having distinct outlines are formed in the same way as in cases in which LDs that emit coherent light are used as the light-emitting elements, even when LEDs or ELs that emit incoherent light are used as the light-emitting elements.

Further, the above describes an example of multiplex-recording plural hologram elements by shift multiplexing method with spherical waves. However, the plural hologram elements may be multiplex-recorded by another multiplexing method, provided that it is a multiplexing method by which the desired diffracted lights are obtained. Moreover, plural types of multiplexing methods may be used in combination. Examples of other multiplexing methods include angle multiplex recording that records while changing the angle of incidence of the reference light, wavelength multiplex recording that records while changing the wavelength of the reference light, and the like.

Further, the above describes a digital color printer of the type in which the image forming devices are in tandem, and LED print heads that serve as exposure devices that expose the photoreceptor drums of the respective image forming units. However, it suffices for there to be an image forming device that forms an image by image-wise exposing a photosensitive image recording medium by an exposure device, and the present invention is not limited to the above-described applied example. For example, the image forming device is not limited to a digital color printer of the electrophotographic method. The exposure device of the present invention may also be incorporated in an image forming device of the silver salt method, a writing device such as optical writing type electronic paper or the like, or the like. Further, the photosensitive image recording medium is not limited to a photoreceptor drum. The exposure device relating to the above-described applied example may also be applied to the exposure of sheet-like photoreceptors or photographic photosensitive materials, photoresists, photopolymers, or the like.

What is claimed is:

1. An exposure device comprising:
a light-emitting element array in which a plurality of light-emitting elements is arranged on a line extending in a predetermined direction; and
a hologram element array in which a plurality of hologram elements is multiplex-recorded, each of the plurality of hologram elements corresponding to each of the plurality of light-emitting elements, respectively, at a recording layer that is disposed above the light-emitting element array, wherein
each of the plurality of hologram elements diffracts and converges lights that exit due to illumination of lights from each of the plurality of light-emitting elements, respectively, to form a plurality of collected-light points on a surface to be exposed,
the plurality of collected-light points is aligned in another substantially straight line extending in the predetermined direction, and
intersection points between optical axes of reference lights and optical axes of signal lights that record the plurality of hologram elements respectively are not aligned in the predetermined direction.

2. The exposure device of claim 1, wherein the plurality of light-emitting elements includes at least six light-emitting elements.

3. The exposure device of claim 1, wherein the plurality of hologram elements are multiplex-recorded such that the intersection points of hologram elements that are adjacent to each other are offset in a direction intersecting the predetermined direction.

4. The exposure device of claim 1, wherein
the plurality of collected-light points includes a first and second collected-light point, the first collected-light point being immediately adjacent to the second collected-light point in the predetermined direction,
the plurality of light-emitting elements includes a first and second light-emitting element, the first light-emitting element substantially causing the first collected-light point, and the second light-emitting element substantially causing the second collected-light point, and
the first and second light-emitting elements are arranged in a substantially straight line that extends in the predetermined direction.

5. The exposure device of claim 1, wherein a light-blocking member, that blocks a portion of or all of lights passing at outer sides of optical paths of diffracted lights exiting from the plurality of hologram elements, is disposed between the surface to be exposed and the light-emitting element array.

6. An image forming device comprising:
the exposure device of claim 1; and
a photoreceptor that is disposed so as to be separated from the exposure device by an operation distance, and on which an image is written due to the photoreceptor being fast-scanned in the predetermined direction by the exposure device in accordance with image data.

* * * * *